United States Patent
Mizutani et al.

(10) Patent No.: US 10,369,532 B2
(45) Date of Patent: Aug. 6, 2019

(54) GAS-DISSOLVING DEVICE AND GAS-DISSOLVING METHOD

(71) Applicant: Hikarimirai Co., Ltd., Tokyo (JP)

(72) Inventors: Yuta Mizutani, Tokyo (JP); Bunshi Cho, Tokyo (JP)

(73) Assignee: Hikarimirai Co., Ltd., Tokyo (JP)

( * ) Notice: Subject to any disclaimer, the term of this patent is extended or adjusted under 35 U.S.C. 154(b) by 76 days.

(21) Appl. No.: 15/028,525

(22) PCT Filed: May 26, 2015

(86) PCT No.: PCT/JP2015/065103
§ 371 (c)(1),
(2) Date: Apr. 11, 2016

(87) PCT Pub. No.: WO2015/182606
PCT Pub. Date: Dec. 3, 2015

(65) Prior Publication Data
US 2017/0065940 A1   Mar. 9, 2017

(30) Foreign Application Priority Data
May 27, 2014  (JP) ................................ 2014-108780

(51) Int. Cl.
*B01F 3/04* (2006.01)
*C02F 1/461* (2006.01)
(Continued)

(52) U.S. Cl.
CPC ...... *B01F 3/04503* (2013.01); *B01F 3/04808* (2013.01); *B01F 3/04815* (2013.01);
(Continued)

(58) Field of Classification Search
CPC ............. A23L 2/54; B01F 2003/04943; B01F 3/04808; B01F 3/04815
See application file for complete search history.

(56) References Cited

U.S. PATENT DOCUMENTS

| | | | |
|---|---|---|---|
| 4,931,000 A * | 6/1990 | Fleming, Jr. .......... | F04B 43/026 417/413.1 |
| 2006/0088739 A1 * | 4/2006 | Ovshinsky ........ | H01M 8/04216 429/9 |

(Continued)

FOREIGN PATENT DOCUMENTS

| JP | 03-146123 A | 6/1991 |
|---|---|---|
| JP | 8-89771 A | 4/1996 |

(Continued)

OTHER PUBLICATIONS

International Search Report received in PCT/JP2015/065103, dated Aug. 18, 2015.

(Continued)

*Primary Examiner* — Salil Jain
(74) *Attorney, Agent, or Firm* — Suzannah K. Sundby, Esq.; Canady + Lortz LLP (57) ABSTRACT

Provided is a gas dissolving device capable of dissolving gas in a liquid in a supersaturated state and maintaining such a saturated state in a stable manner, and being easily attached to a water server or the like.

The gas dissolving device generates hydrogen water by dissolving hydrogen in water, and discharges the hydrogen water from an outlet. The gas dissolving device includes a dissolving chamber that stores under pressure generated hydrogen water introduced therein, and pressure reduction and transfer means for preventing pressure variation in a tube-shaped passage that connects the dissolving tank and the outlet due to an action of discharging the hydrogen water from the outlet, and for forming a laminar flow.

10 Claims, 2 Drawing Sheets

(51) Int. Cl.
*C02F 1/68* (2006.01)
*B01F 3/22* (2006.01)
*B01F 5/10* (2006.01)
*C02F 9/00* (2006.01)
*A23L 2/54* (2006.01)
*C02F 1/00* (2006.01)
*C02F 1/28* (2006.01)
*C02F 1/42* (2006.01)
*C02F 1/44* (2006.01)

(52) U.S. Cl.
CPC ............ *B01F 3/2261* (2013.01); *B01F 5/106* (2013.01); *C02F 1/4618* (2013.01); *C02F 1/46104* (2013.01); *C02F 1/685* (2013.01); *C02F 9/00* (2013.01); *A23L 2/54* (2013.01); *A23V 2002/00* (2013.01); *B01F 2003/04914* (2013.01); *B01F 2215/0022* (2013.01); *C02F 1/003* (2013.01); *C02F 1/283* (2013.01); *C02F 1/42* (2013.01); *C02F 1/444* (2013.01); *C02F 1/68* (2013.01); *C02F 2001/4619* (2013.01); *C02F 2209/03* (2013.01); *C02F 2301/022* (2013.01); *C02F 2307/10* (2013.01); *Y02E 60/324* (2013.01)

(56) References Cited

U.S. PATENT DOCUMENTS

| 2009/0308253 | A1* | 12/2009 | Washio | B01D 19/0036 96/194 |
| 2016/0076155 | A1* | 3/2016 | Kim | C25B 1/04 204/263 |

FOREIGN PATENT DOCUMENTS

| JP | H08-89771 | * | 4/1996 | ............ Y02W 10/15 |
| JP | H0889771 | * | 4/1996 | ............ Y02W 10/15 |
| JP | 2000-334283 | A | 12/2000 | |
| JP | 2004-350538 | A | 12/2004 | |
| JP | 2007-237161 | A | 9/2007 | |
| JP | 2008-006365 | A | 1/2008 | |
| JP | 2008-188574 | A | 8/2008 | |
| JP | 2009-112979 | A | 5/2009 | |
| JP | 5342156 | A | 9/2009 | |
| JP | 2010-115594 | A | 5/2010 | |
| JP | 3161567 | U | 8/2010 | |
| JP | 2010-207691 | A | 9/2010 | |
| JP | 2011-20005 | A | 2/2011 | |
| JP | 2013-022567 | A | 2/2013 | |
| JP | 2013-094757 | A | 5/2013 | |
| JP | 2013-107060 | A | 6/2013 | |
| JP | 2013-126650 | A | 6/2013 | |
| JP | 2013107060 | A | * | 6/2013 |
| JP | 3190824 | U | 5/2014 | |
| WO | 2014073938 | A1 | 5/2014 | |

OTHER PUBLICATIONS

Written Opinion received in PCT/JP2015/065103, dated Aug. 18, 2015.

Nakao, et al., "Amelioration of rat cardiac cold ischemia/reperfusion injury with inhaled hydrogen or carbon monoxide, or both", Dec. 24, 2009, pp. 544-553, vol. 29, No. 5, Publisher: J Heart Lung Transplant (Abstract).

Dole, et al., "Hyperbaric hydrogen therapy: a possible treatment for cancer", Oct. 10, 1975, pp. 152-154, vol. 190, No. 4210, Publisher: Science (Abstract).

Gharib, et al., "Anti-inflammatory properties of molecular hydrogen: investigation on parasite-induced liver inflammation", Aug. 1, 2001, pp. 719-724, vol. 324, No. 8, Publisher: C R Acad Sci III. (Abstract).

Itoh, et al., "Molecular hydrogen inhibits lipopolysaccharide/interferon-induced nitric oxide production through modulation of signal transduction in macrophages", Jul. 22, 2011, pp. 143-149, vol. 411, No. 1, Publisher: Biochem Biophys Res Commun. (Abstract).

Kajiyama, et al., "Supplementation of hydrogen-rich water improves lipid and glucose metabolism in patients with type 2 diabetes or impaired glucose tolerance", Mar. 1, 2008, pp. 137-143, vol. 28, No. 3, Publisher: Nutr Res. (Abstract).

Oharazawa, "Protection of the retina by rapid diffusion of hydrogen: administration of hydrogen-loaded eye drops in retinal ischemia-reperfusion injury", Oct. 15, 2009, pp. 487-492, vol. 51, No. 1, Publisher: Invest Ophthalmol Vis Sci. (Abstract).

Ohsawa, et al., "Hydrogen acts as a therapeutic antioxidant by selectively reducing cytotoxic oxygen radicals", May 7, 2007, pp. 688-694, vol. 13, No. 6, Publisher: Nat Med. (Abstract).

Saitoh, et al., "Platinum nanocolloid-supplemented hydrogendissolved water inhibits growth of human tongue carcinoma cells preferentially over normal cells", Sep. 1, 2009, pp. 156-162, vol. 31, No. 3, Publisher: Exp Oncol. (Abstract).

First Office Action received in CN 201580003363.3 dated Jul. 18, 2018.

* cited by examiner

GAS-DISSOLVING DEVICE AND GAS-DISSOLVING METHOD

BACKGROUND OF THE INVENTION

Field of the Invention

The present invention relates to a gas dissolving device and a gas dissolving method, and more particularly to a gas dissolving device and a gas dissolving method that can be provided to dissolve a gas in a liquid in a supersaturated state, and maintain such a supersaturated state in a stable manner.

Description of the Background Art

In recent years, soft drinks and the like obtained by filling a beverage such as water or tea with a gas such as carbon dioxide or hydrogen have been sold. Thus, with the intake of a gas filled into a liquid, the human body can ingest a gas not easily ingestible as is, thereby making it possible to more easily achieve the useful effects of individual gases.

For example, there are sold soft drinks obtained by filling a beverage such as water or tea with hydrogen gas. An object of such a soft drink is to reduce reactive oxygen species that exist in the human body by the intake of the hydrogen gas filled into the liquid.

On the other hand, reactive oxygen species are essential to sustaining life, playing an important role in the production of adenosine triphosphate (ATP) in a citric acid cycle and the like, and have been determined to also serve the role of eliminating foreign substances that have entered the human body. Additionally, reactive oxygen species that have not been used in a reaction in a living body and the like are normally broken down by enzymes that exist in cells. Nevertheless, all reactive oxygen species are not necessarily broken down by enzymes, resulting in excess reactive oxygen species that exist without being broken down. As a result, cells are damaged by the excess reactive oxygen species, causing sicknesses such as cancer and life-style related diseases, aging, and the like, requiring the elimination of excess reactive oxygen species for the purpose of health maintenance.

Hence, in recent years, hydrogen has been used as a substance that eliminates such excess reactive oxygen species. This is because hydrogen is highly safe as it is easily absorbed by the body due to its extremely low molecular weight, and changes to water upon reaction with reactive oxygen species, and the like. Further, hydrogen particularly selects and reduces only hydroxyl radicals among the many reactive oxygen species, and does not affect reactive oxygen species useful to the body.

Thus, the positive pathological effects of hydrogen, which is considered to lead to the prevention of illness and the promotion of health without any particular harm, are reported in many academic journals and the like, such as Non-Patent Documents 1 to 10, and are too numerous to mention.

As described above, the intake of hydrogen gas achieves the useful effects of the prevention of illness and the promotion of health. Further, the intake of other gases achieves the useful effects of the prevention of illness and the promotion of health specific to the gas. As a result, various means have been disclosed with the object to dissolve a gas such as hydrogen in a liquid.

For example, Patent Document 1 discloses a method of generating hydrogen water by bringing hydrogen gas or a mixed gas that includes hydrogen gas into contact with drinking water under pressure in an airtight container (A) to dissolve the hydrogen in the drinking water. The hydrogen water in the container (A) is then discharged for use. When an internal pressure of the container (A) has decreased, discharge is stopped. The airtight container (A) is subsequently filled with new drinking water, thereby increasing the internal pressure of the container (A). Hydrogen is then dissolved in the drinking water filled in the container (A) once again. Further, Patent Document 2 discloses a hydrogen water provided to a beverage, wherein hydrogen water containing microbubbles of hydrogen gas having a particle size of about 1 μm to 50 μm is obtained by passing an aqueous solution, having hydrogen gas dissolved therein to a saturated state, through small holes of an orifice to release pressure, thereby producing the dissolved hydrogen gas as fine air bubbles. These fine air bubbles are then introduced to and passed through a net member, thereby refining the air bubbles to microbubbles having a particle size of about 1 μm to 50 μm. Furthermore, Patent Document 3 discloses a hydrogen water producing device that includes a condensation device that generates condensation by condensing moisture in air, a hydrogen water generating device that generates hydrogen water having active hydrogen dissolved therein by producing a hydrogen producing reaction with this condensation, a filter unit that removes impurities from this hydrogen water to form hydrogen water, and a drinking water server that stores and supplies this hydrogen water as drinking water.

Further, Patent Document 4 discloses a device for producing water with added hydrogen that includes hydrogen in large amounts as microbubbles, the device comprising (a) a tube body, (b) a raw water supply system that is formed at one end portion of the tube body and supplies raw water at high pressure, (c) a hydrogen supply system that is connected in a water-tight manner to the tube body and supplies hydrogen substantially perpendicularly to the raw water supplied from the raw water supply system, (d) a diffusion chamber that is formed in a longitudinal direction of the tube body, downstream of the hydrogen supply system in the tube body, and diffuses a mixed fluid of raw water supplied from the raw water supply system to the tube body and hydrogen supplied from the hydrogen supply system to the tube body, (e) a porous element for causing the supplied hydrogen to pass therethrough as microbubbles, the porous element being filled into the diffusion chamber and having a predetermined hole diameter, and (f) a discharge port that is formed at the other end portion of the tube body and discharges the produced water with added hydrogen. Furthermore, Patent Document 5 discloses a continuous hydrogen water producing device comprising a water supply unit, a hydrogen supply unit, a gas-liquid mixing pump that receives supplies of water and hydrogen from each supply unit and discharges hydrogen-mixed water, an agitating unit that agitates the hydrogen-mixed water discharged from the gas-liquid mixing pump, and a gas-releasing stabilizing tank in which the hydrogen-mixed water from the agitating unit forms a predetermined retarded flow to release the hydrogen other than the dissolved hydrogen. Furthermore, Patent Document 6 discloses a hydrogen water producing device comprising a container for dissolving hydrogen in stored water, a hydrogen producing unit that produces hydrogen by hydrolysis of magnesium hydride, a hydrogen supply tube that supplies hydrogen produced in the hydrogen producing unit to the container, and a hydrogen water supply tube for supplying hydrogen water formed by dissolving pressurized hydrogen in the water stored in the container to the outside.

Further, Patent Document 7 discloses a gas dissolving device comprising a pressurized gas dissolving mechanism that dissolves gas in a liquid by bringing a pressurized liquid and a pressurized gas into contact with each other, and a pressure reducing mechanism located after the pressurized gas dissolving mechanism in a liquid flow passage. The pressure reducing mechanism causes the pressurized liquid to flow on an inner side of a plurality of capillaries, thereby reducing the pressure of the liquid.

NON-PATENT DOCUMENTS

Non-Patent Document 1: Nature Medicine, 2007, Vol. 13, pp. 688-694
Non-Patent Document 2: T. Itoh et al., Biochem. Biophys. Res. Comm., 411 (2011), pp. 143-149
Non-Patent Document 3: S. Kajiyama et al., Nutrition Research, 28 (2008), pp. 137-143
Non-Patent Document 4: N. Atsunori et al., BJ. Heart and Lung Transplantation
Non-Patent Document 5: K. Koyama et al., Anti-Aging Medicine, Journal of Japanese Society of Anti-Aging Medicine, Vol. 4, No. 1, pp. 117-122
Non-Patent Document 6: Y. Saito, Exp. Oncology, 31 (2009), pp. 156-162
Non-Patent Document 7: S. Ota and I. Osawa et al., Jikken Igaku, Mol. 26, No. 13 (2008, No. 8), pp. 2074-2080
Non-Patent Document 8: H. Oharazawa et al., Investigative Ophthalmology & Visual Sci., 51 (2010), pp 487-492
Non-Patent Document 9: M. Dole, Science, New Series, 190, 4210 (Oct. 10, 1975), pp. 152-154
Non-Patent Document 10: B. Ghrib et al., Life Sci., 324 (2001), pp 719-724

PATENT DOCUMENTS

Patent Document 1: Japanese Patent Laid-Open No. 2013-126650
Patent Document 2: Japanese Patent No. 5342156
Patent Document 3: Japanese Patent Laid-Open No. 2013-94757
Patent Document 4: Japanese Patent Laid-Open No. 2007-237161
Patent Document 5: Japanese Patent Laid-Open No. 2008-6365
Patent Document 6: Japanese Patent Laid-Open No. 2013-22567
Patent Document 7: Japanese Patent Laid-Open No. 08-89771

SUMMARY OF THE INVENTION

Problems to be Solved by the Invention

While the technologies described in Patent Documents 1 to 6 above are capable of obtaining hydrogen water, the technologies are not capable of dissolving gas in a liquid in a supersaturated state and maintaining the supersaturated state in a stable manner. Rather, the concentration of the supplied hydrogen water is low, resulting in failure to achieve a sufficient hydrogen water effect. Furthermore, the device is large in scale and therefore requires sufficient space and the like, resulting in the problem that the device cannot be easily attached to a water server or the like.

Further, in the technology described in Patent Document 7, the pressure reducing mechanism includes the plurality of capillaries and therefore requires an increased amount of space for the pressure reducing mechanism, resulting in the problem that the device cannot be easily attached to a water server or the like. Furthermore, with the plurality of capillaries, manufacturing as well as repair at the time of failure are complex, resulting in problems in practical use in attaching and applying the device to a water server or the like.

It is therefore an object of the present invention to resolve the problems of the above-described prior art and provide a gas dissolving device that can be provided to dissolve gas in a liquid in a supersaturated state and maintain such a supersaturated state in a stable manner, and can be easily attached to a water server or the like.

Means for Solving the Problems

As a result of intensive studies conducted to solve the problems described above, the inventors discovered that the above-described object can be achieved by providing pressure reduction and transfer means and further adjusting the pressure applied to the liquid, thus completing the present invention.

That is, a gas dissolving device of the present invention is a gas dissolving device that generates hydrogen water by dissolving hydrogen in water, and discharges the hydrogen water from an outlet. The gas dissolving device includes a dissolving chamber that stores under pressure generated hydrogen water introduced therein, and pressure reduction and transfer means for preventing pressure variation in a tube-shaped passage that connects the dissolving chamber and the outlet due to an action of discharging hydrogen water from the outlet, and for forming a laminar flow. According to such an invention, it is possible to provide generated hydrogen water to the outside without separating the hydrogen from the hydrogen water.

In the present invention, the pressure reduction and transfer means may include a pressure adjusting unit that is tapered so as to increase or decrease a tube diameter near the outlet of the tube-shaped passage.

In the present invention, pressurized gas dissolving means that simultaneously supplies water and hydrogen bubbles under pressure by a diaphragm pump may be connected to the dissolving chamber.

In the present invention, given $X$ and $L$ as an inside diameter and a length of the tube-shaped passage, respectively, and $Y$ as a pressure applied to the pressurized gas dissolving means, values of $X$, $Y$, and $L$ may be selected so that a laminar flow is formed in the hydrogen water in the tube-shaped passage.

In the present invention, the hydrogen water stored under pressure in the dissolving chamber may once again be fed to the pressurized gas dissolving means, and simultaneously supplied under pressure with hydrogen bubbles.

In the present invention, hydrogen water stored under pressure in the dissolving chamber may be introduced into a water tank, and water in the water tank may be fed to the pressurized gas dissolving means and simultaneously supplied under pressure with the hydrogen bubbles.

Further, a gas dissolving method of the present invention is a method of generating hydrogen water by dissolving hydrogen in water, and discharging the hydrogen water from an outlet. In a gas dissolving device that includes at least a dissolving chamber that stores under pressure generated hydrogen water introduced therein, and a tube-shaped passage that connects the dissolving chamber and the outlet, the gas dissolving method prevents pressure variation in the tube-shaped passage due to an action of discharging hydrogen water from the outlet, and forms a laminar flow in the tube-shaped passage.

In the present invention, the gas dissolving device may further include pressurized gas dissolving means that is connected to the dissolving chamber and simultaneously supplies water and hydrogen bubbles under pressure by a diaphragm pump, and the hydrogen water stored under pressure in the dissolving chamber may be once again fed to the pressurized gas dissolving means and simultaneously supplied under pressure with the hydrogen bubbles.

In the present invention, the hydrogen water stored under pressure in the dissolving chamber may be introduced into a water tank, and water in the water tank may be fed to the pressurized gas dissolving means and simultaneously supplied under pressure with the hydrogen bubbles.

In the present invention, hydrogen water that includes hydrogen bubbles having an average diameter of at least 200 nm or less may be stored under pressure in the dissolving chamber.

DESCRIPTION OF THE PREFERRED EMBODIMENTS

The following specifically describes a gas dissolving device of the present invention.

Figure 1:
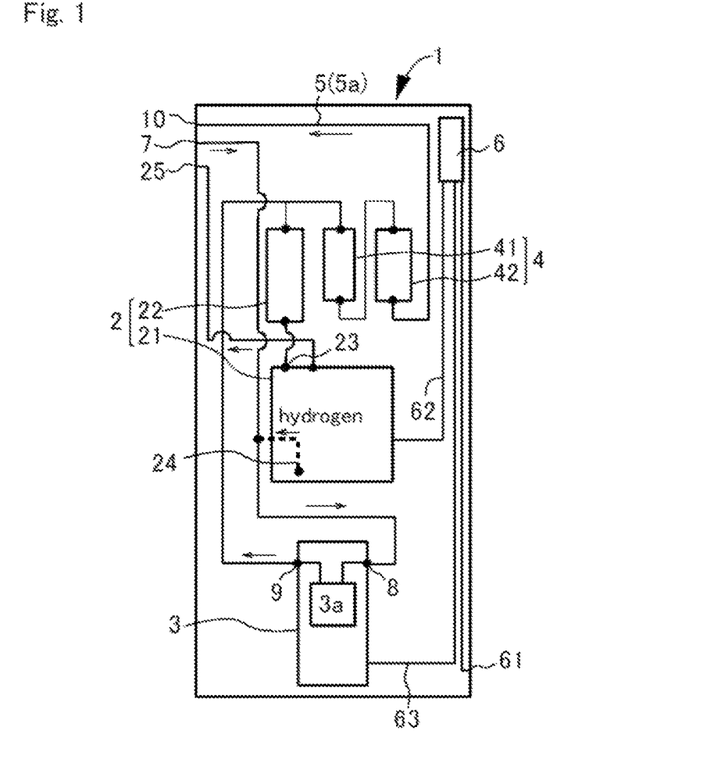
FIG. 1 is a diagram illustrating a gas dissolving device of the present invention.

FIG. 1 is a cross-sectional view illustrating an example of a gas dissolving device of the present invention. In FIG. 1, 1 denotes a gas dissolving device, 2 denotes gas producing means, 3 denotes pressurized gas dissolving means, 4 denotes a dissolving chamber, and 5 denotes pressure reduction and transfer means. The gas dissolving device 1 includes the gas producing means 2 that produces gas, the pressurized gas dissolving means 3 that dissolves this gas under pressure in a liquid, the dissolving chamber 4 that dissolves and stores the liquid having the gas dissolved therein, and the pressure reduction and transfer means 5 that reduces pressure by causing this liquid to flow through a small tube 5a.

Here, the pressure reduction and transfer means 5 prevents pressure variation in the tube-shaped passage 5a that connects the dissolving chamber 4 and an outlet 10 due to an action of discharging hydrogen water from the outlet 10, and forms a laminar flow in the tube-shaped passage 5a. For example, the tube-shaped passage 5a of the pressure reduction and transfer means 5, although dependent on the pressure of the liquid that flows through an interior thereof, is preferably relatively long in length and small in diameter, and may include a pressure adjusting unit that is tapered so as to cause a tube diameter near the outlet of the tube-shaped passage 5a to narrow or widen.

Further, given X mm as an inside diameter of the small tube 5a and Y MPa as a pressure applied by the pressurized gas dissolving means 3, the gas dissolving device 1 of the present invention forms a laminar flow in the small tube 5a, and the value of X/Y is 1.00 to 12.00, preferably 3.30 to 10.0, and more preferably 4.00 to 6.67. The liquid that dissolves the gas in a supersaturated state is made to flow through the small tube 5a in a laminar flow state under such conditions and is depressurized and transferred, thereby making it possible to dissolve the gas in the liquid in a supersaturated state, and transfer the liquid while maintaining the supersaturated state in a stable manner. While a solubility of a gas in a liquid differs according to temperature, the term "supersaturated" here refers to a dissolved amount of gas in a liquid at a certain temperature A (° C.) being greater than a solubility at the temperature A (° C.).

Furthermore, in FIG. 1, the gas producing means 2 includes hydrogen producing means 21 and further includes ion exchanging means 22. Further, the hydrogen producing means 21 produces hydrogen by electrolysis, and may be a device known as a proton exchange membrane (PEM) system, for example. It should be noted that the ion exchanging means 22 performs ion exchange using an ion exchange resin or the like, and the gas producing means 2 preferably includes but does not have to include the ion exchanging means 22.

In FIG. 1, water is used as the liquid. With combined reference to FIGS. 1 and 2, water is suctioned into a liquid suction port 7 (S1), this water is then suctioned by a pump 3a via a suction port 8 of the pressurized gas dissolving means 3 and merged and mixed with hydrogen from the hydrogen producing means 21 described later in a pipe (S2') and, once the mixture is dissolved under pressure (S2), the water is subsequently discharged from a discharge port 9. A portion of the discharged water is separated (S2"), ion exchange is performed in the ion exchanging means 22 (S3), and the water is fed to the hydrogen producing means 21 via a hydrogen producing means inlet 23. In the hydrogen producing means 21, hydrogen is produced by electrolysis (S4) using the ion-exchanged water, passed through a hydrogen supply tube 24, and fed to the suction port 8 of the pressurized gas dissolving means 3. Further, oxygen produced by electrolysis is passed through an oxygen discharge port 25 and discharged outside the gas dissolving device 1.

Figure 2:
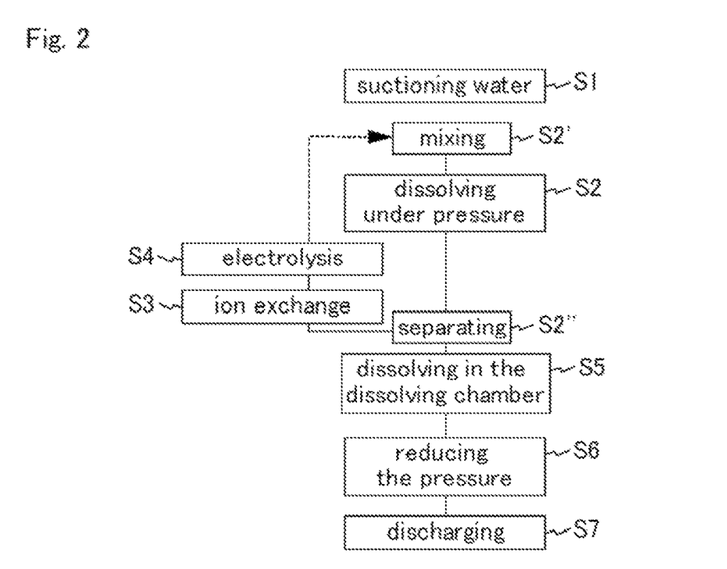
FIG. 2 is a chart illustrating gas dissolving steps of the present invention.

The hydrogen produced by electrolysis is fed to the suction port 8 of the pressurized gas dissolving means 3 and pressurized by the pump 3a thereof, thereby dissolving the hydrogen under pressure in the water suctioned from the liquid suction port 7. The water having the hydrogen dissolved under pressure therein is discharged from the discharge port 9 of the pressurized gas dissolving means 3, and dissolved in the dissolving chamber 4 in a supersaturated state (S5). The liquid dissolved in the dissolving chamber 4 is made to flow through the small tube 5a, which serves as the pressure reduction and transfer means 5, while maintaining a laminar flow state, thereby reducing the pressure of the liquid (S6). This liquid is then discharged from a hydrogen water discharge port 10 to the outside (S7).

Further, in the gas dissolving device 1 of the present invention, the inside diameter X of the small tube 5a, which serves as the pressure reduction and transfer means 5, is preferably 0.1 mm to 5.0 mm inclusive, more preferably greater than 1.0 mm and 3.0 mm or less, and even more preferably 2.0 mm to 3.0 mm inclusive. With establishment of such a range, the pressure can be reduced and a laminar flow can be formed in the tube by including one small tube 5a without the need to install 10 or more small tubes for pressure reduction, as in the technology described in Japanese Patent Laid-Open No. 08-89771. Further, this makes it possible to easily attach the gas dissolving device to a water server or the like, facilitate manufacturing as well as repair at the time of failure, and make attachment to the water server or the like even easier. It should be noted that, in the present invention, the inside diameter X of the small tube does not simply refer to the inside diameter in the case of a single tube, but also refers to, for example, the inside diameter X and the like of the small tubes of a double tube as well, regardless of shape.

Furthermore, in the present invention, the pressure Y of the pressurized gas dissolving means 3 at 20° C. is preferably 0.10 to 1.0 MPa, more preferably 0.15 to 0.65 MPa, even more preferably 0.20 to 0.55 MPa, and most preferably 0.23 to 0.50 MPa. With the pressure set to such a range, the gas can be easily dissolved in the liquid. Further, the pressurized gas dissolving means 3 is preferably installed with the direction of the discharge port 9 facing upward. This increases the pump pressure-feeding efficiency, making it possible to increase the dissolution efficiency of the gas.

Furthermore, the gas dissolving device 1 of the present invention preferably circulates the liquid having the gas dissolved under pressure in the pressurized gas dissolving means 3 therein without discharging the liquid, preferably feeding the liquid to the pressurized gas dissolving means 3 and, upon circulation, feeding the liquid to the pressure reduction and transfer means 5. This makes it possible to further increase the dissolved concentration of the gas. Further, while the circulation count is not particularly limited, the maximum dissolved concentration is preferably reached within a circulation count of 1 to 10, and more preferably within a circulation count of 1 to 5.

Furthermore, the gas dissolving device 1 of the present invention preferably includes a control mechanism 6 that controls the gas producing means 2 and the pressurized gas dissolving means 3. The control mechanism 6 is connected to a power supply by a power plug 61. Further, the control mechanism 6 is connected to the gas producing means 2 and the pressurized gas dissolving means 3 by a wiring 62 connected to the gas producing means 2 and a wiring 63 connected to the pressurized gas dissolving means 3. This makes it possible to control the gas producing means 2 and the pressurized gas dissolving means 3 using electric power.

Furthermore, in the gas dissolving device 1 of the present invention, preferably an operation time of the gas producing means 2 and the pressurized gas dissolving means 3 is 5 to 60 minutes, and the gas producing means 2 and the pressurized gas dissolving means 3 are controlled for a stop time equivalent to 1 to 5 times this operation time; more preferably the operation time of the gas producing means 2 and the pressurized gas dissolving means 3 is 10 to 30 minutes, and the gas producing means 2 and the pressurized gas dissolving means 3 are controlled for a stop time equivalent to 2 to 4 times this operation time; and most preferably the operation time of the gas producing means 2 and the pressurized gas dissolving means 3 is 10 to 20 minutes, and the gas producing means 2 and the pressurized gas dissolving means 3 are controlled for a stop time equivalent to 3 times this operation time, by the control mechanism 6. With such control, it is possible to efficiently dissolve the hydrogen in the liquid in a saturated state. It should be noted that this control can be performed by imparting a timer function to the control mechanism.

Further, in the gas dissolving device 1 of the present invention, preferably the pressurized gas dissolving means 3 is capable of simultaneously pressurizing a gas and a liquid to dissolve the gas in the liquid and, while not particularly limited, includes the diaphragm pump 3a. Use of the diaphragm pump 3a makes it possible to provide the pressurized gas dissolving means 3 in a smaller space.

Furthermore, the gas dissolving device 1 of the present invention preferably includes one or two or more, in particular preferably two or more, dissolving chambers 4, to ensure that the dissolving chambers 4 have a capacity of one-third with respect to the flow rate. Two or more dissolving chambers 4 makes it possible to dissolve the gas more efficiently in a short period of time to a high concentration. In FIG. 1, the gas dissolving device 1 comprises a dissolving tank 41 that includes a microfilter made of a porous body or the like in an interior thereof, and a dissolving tank 42 that includes an activated carbon filter in an interior thereof, making it possible to maintain a supersaturated state in a more stable manner.

Further, in the present invention, the dissolving chamber 4 is not particularly limited to a shape or the like as long as the dissolving chamber 4 is capable of dissolving the gas under pressure in a dissolved state, and the microfilter or active carbon filter may be another filter. Furthermore, the dissolving chamber 4 preferably captures the liquid having the gas dissolved therein from an upper side of the dissolving tank 41, and feeds the liquid from a lower side to the pressure reduction and transfer means 5. As a result, gas accumulates in the upper area of the dissolving tank 41, making it possible to separate the liquid and the gas and thus feed only the liquid having the gas dissolved therein to the pressure reduction and transfer means 5. This makes it possible to prevent only the gas from being fed to the pressure reduction and transfer means 5 and to generate and maintain the dissolution of the gas in a stable state.

Figure 3:
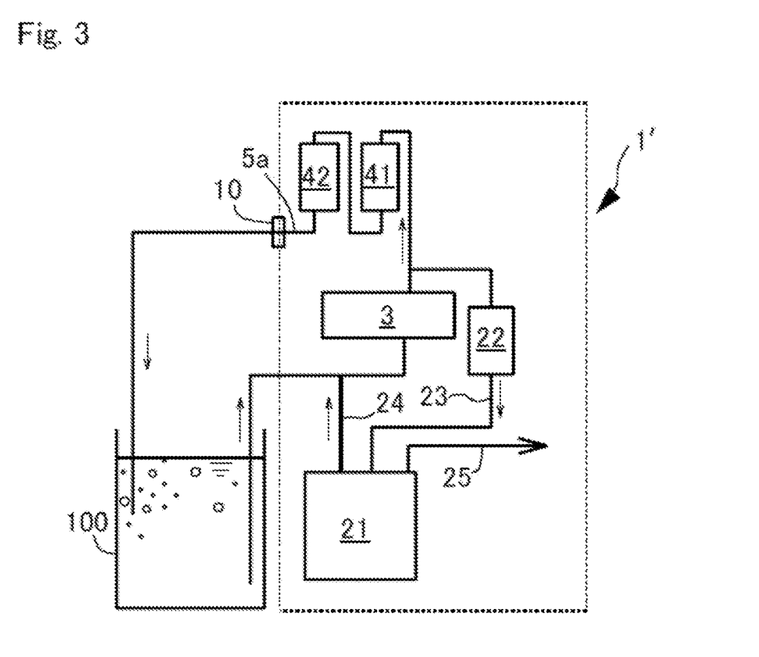
FIG. 3 is a diagram illustrating an example of use of the gas dissolving device of the present invention.

FIG. 3 is a diagram illustrating an example of use of the gas dissolving device of the present invention. In FIG. 3, 100 denotes a water server. A gas dissolving device 1' is attached to the water server 100, making it possible to produce hydrogen gas using water in the water server 100 and further supply supersaturated hydrogen water using the hydrogen gas. Further, the supersaturated hydrogen water can be stored and circulated in the water server 100, making it possible to supply the supersaturated hydrogen water at all times.

Figure 4:
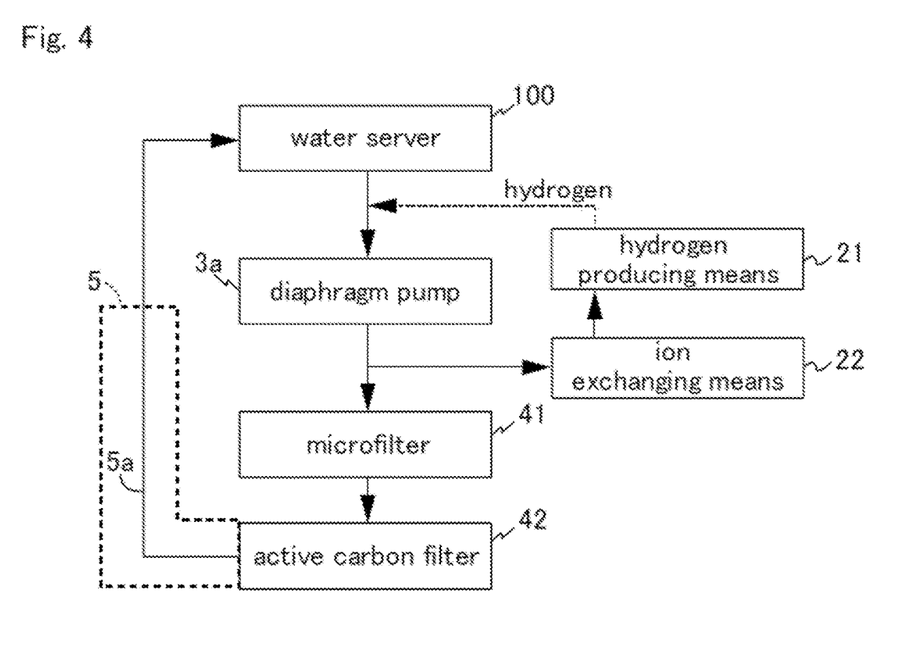
FIG. 4 is a configuration chart illustrating the gas dissolving steps of the device in FIG. 3.

Specifically, with combined reference to FIGS. 3 and 4, the water and the hydrogen from the water server 100 and the gas producing means 2, respectively, are simultaneously introduced to the diaphragm pump 3a of the pressurized gas dissolving means 3 and bubbled while pressurized to obtain hydrogen water. Such hydrogen water is passed through the microfilter (dissolving tank) 41 made of a porous body or the like and the active carbon filter (dissolving tank) 42 and introduced once again to the water server 100 via the small tube 5a of the pressure reduction and transfer means 5 while the pressurized state in the diaphragm pump 3a is maintained. Further, a portion of the hydrogen water that leaves the diaphragm pump 3a is fed to the hydrogen producing means 21 via the ion exchanging means 22 and subjected to electrolysis to produce hydrogen. Such hydrogen is fed to the diaphragm pump 3a of the pressurized gas dissolving device 3.

With such a device, nanobubbles of 500 nm or less are optically observed once operation has continued for approximately 30 minutes, and nanobubbles of about 200 nm are optically observed once operation has continued for three days.

While the above has described an example in which hydrogen is used as the gas, another gas may be dissolved in a supersaturated state. If, for example, a carbon dioxide gas cylinder, a nitrogen gas cylinder, an oxygen gas cylinder and the like are used as the gas producing means 2, various gases may be dissolved in a supersaturated state. This makes it possible to dissolve one or more types of gases selected from a group formed by hydrogen, carbon dioxide, nitrogen, and oxygen in a liquid in a supersaturated state.

However, hydrogen is most preferred as the gas. Hydrogen has a low molecular weight, and is considered to more easily maintain a supersaturated state when inserted between contents in a liquid, such as between molecules of water. Further, the concentration of hydrogen in the liquid is preferably greater than 2.0 ppm, and more preferably 2.0 to 8.0 ppm, at 7° C. With a concentration greater than 2.0 ppm, the supersaturated state can be maintained.

Furthermore, in the present invention, the hydrogen can be dissolved at a liquid temperature of 30 to 95° C., and the concentration in the liquid is preferably greater than 2 ppm, and more preferably 3 to 4 ppm, at 42° C. A concentration greater than 2 ppm makes it possible to use the hydrogen water in a shower, a bath, and the like as well. Further, the dissolved concentration of hydrogen at a hot water temperature of 80° C. is preferably 1.0 ppm or greater.

Further, in the present invention, when hydrogen is used as the gas, the hydrogen is preferably produced by electrolysis as illustrated by the hydrogen producing means 21 in FIGS. 1 and 3 described above. For example, even if the device is not a proton exchange membrane (PEM) system, an aqueous solution that includes 25% KOH may be poured into an alkali electrolytic tank and subjected to electrolysis to produce hydrogen, and such hydrogen may be used as the gas. This makes it possible to use the hydrogen under a pressure of approximately 1 MPa or less in contrast to the approximately 15 MPa required for conventional filling using a hydrogen cylinder, allowing safer usage. Further, the hydrogen produced from the hydrogen producing means 21 is used as the gas onsite, making it possible to significantly decrease cost compared to when the hydrogen is supplied from a cylinder.

Further, in the present invention, the type of liquid is not particularly limited. Possible examples of the liquid include beverages such as water, tea, coffee, or the like, with water being particularly preferred. Water can dissolve various gases, and can minimize the effects on other components.

Further, in the present invention, as the small tube serving as the pressure reduction and transfer means 5, a member normally applicable when a liquid or a gas flows therethrough can be used in a range that does not obstruct the effect of the present invention. Examples include a small tube made of polypropylene. Further, the small tube is preferably structured so as to be free of gas leakage, such as by depositing aluminum on an exterior of the small tube.

The following describes the present invention in further detail using examples. The present invention, however, is not limited to these examples.

EXAMPLES

Example 1

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.6 m was used as the small tube 5a of the pressure reduction and transfer means 5. The hydrogen water was generated using a pressure of 0.41 MPa, a hydrogen production rate of 21 $cm^3$/min, and a water flow rate of 730 $cm^3$/min. The hydrogen water had a hydrogen concentration of 6.5 ppm at 7° C. in water after 30 minutes of operation, and a supersaturated state was maintained.

Example 2

The gas dissolving device 1 illustrated in FIG. 1 was connected to a water supply and circulated four times to generate hydrogen water. A small tube made of polypropylene having an inside diameter of 2 mm and a length of 1.6 m was used as the small tube 5a of the pressure reduction and transfer means 5. The hydrogen water was generated using a pressure of 0.25 MPa, a hydrogen production rate of 21 $cm^3$/min, and a water flow rate of 730 $cm^3$/min. The hydrogen water had a hydrogen concentration of 2.6 ppm at 11° C. in water after 30 minutes of operation, and a supersaturated state was maintained.

Example 3

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.6 m was used as the small tube 5a of the pressure reduction and transfer means 5. The hydrogen water was generated using a pressure of 0.30 MPa, a hydrogen production rate of 21 $cm^3$/min, and a water flow rate of 730 $cm^3$/min. The hydrogen water had a hydrogen concentration of 5.9 ppm at 7° C. in water after 30 minutes of operation, and a supersaturated state was maintained.

Example 4

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.5 m was used as the small tube 5a of the pressure reduction and transfer means 5. The hydrogen water was generated using a pressure of 0.35 MPa, a hydrogen production rate of 25 $cm^3$/min, and a water flow rate of 590 $cm^3$/min. The hydrogen water had a hydrogen concentration of 3.0 ppm at 7° C. in water after 30 minutes of operation, and a supersaturated state was maintained.

Example 5

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.6 m was used as the small tube 5a of the pressure reduction and transfer means 5. The hydrogen water was generated using a pressure of 0.38 MPa, a hydrogen production rate of 25 $cm^3$/min, and a water flow rate of 560 $cm^3$/min. The hydrogen water had a hydrogen concentration of 3.8 ppm at 7° C. in water after 30 minutes of operation, and a supersaturated state was maintained.

Example 6

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.8 m was used as the small tube 5a of the pressure reduction and transfer means 5. The hydrogen water was generated using a pressure of 0.40 MPa, a hydrogen production rate of 25 $cm^3$/min, and a water flow rate of 540 $cm^3$/min. The hydrogen water had a hydrogen concentration of 4.2 ppm at 7° C. in water after 30 minutes of operation, and a supersaturated state was maintained.

Example 7

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.8 m was used as the small tube 5a of the pressure reduction and transfer means 5. The hydrogen water was generated using a pressure of 0.45 MPa, a hydrogen production rate of 20 $cm^3$/min, and a water flow rate of 560 $cm^3$/min. The hydrogen water had a hydrogen concentration of 4.5 ppm at 7° C. in water after 30 minutes of operation, and a supersaturated state was maintained.

Example 8

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.8 m was used as the small tube 5a of the pressure reduction and transfer means 5. The hydrogen water was generated using a pressure of 0.50 MPa, a hydrogen production rate of 15 $cm^3$/min, and a water flow rate of 570 $cm^3$/min. The hydrogen water had a hydrogen concentration of 4.2 ppm at 7° C. in water after 30 minutes of operation, and a supersaturated state was maintained.

Example 9

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 2.0 m was used as the small tube 5a of the pressure reduction and transfer means 5. The hydrogen water was generated using a pressure of 0.60 MPa, a hydrogen production rate of 15 $cm^3$/min, and a water flow rate of 460 $cm^3$/min. The hydrogen water had a hydrogen concentration of 3.4 ppm at 7° C. in water after 30 minutes of operation, and a supersaturated state was maintained.

Example 10

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 1.4 m was used as the small tube 5a of the pressure reduction and transfer means 5. The hydrogen water was generated using a pressure of 0.20 MPa, a hydrogen production rate of 30 $cm^3$/min, and a water flow rate of 550 $cm^3$/min. The hydrogen water had a hydrogen concentration of 2.7 ppm at 7° C. in water after 30 minutes of operation, and a supersaturated state was maintained.

Example 11

The gas dissolving device 1 illustrated in FIG. 1 was connected to the commercial water server 100 as illustrated in FIG. 3 and circulated four times to generate hydrogen water. A small tube made of polypropylene having an inside diameter of 2 mm and a length of 3 m was used as the small tube 5a of the pressure reduction and transfer means 5. The hydrogen water was generated using a pressure of 0.50 MPa, a hydrogen production rate of 20 $cm^3$/min, and a water flow rate of 550 $cm^3$/min. The hydrogen water had a hydrogen concentration of 2.4 ppm at 7° C. in water after 30 minutes of operation, and a supersaturated state was maintained.

Example 12

The gas dissolving device 1 illustrated in FIG. 1 was connected to the commercial water server 100 as illustrated in FIG. 3 and circulated four times to generate hydrogen water. A small tube made of polypropylene having an inside diameter of 3 mm and a length of 4 m was used as the small tube 5a of the pressure reduction and transfer means 5. The hydrogen water was generated using a pressure of 0.35 MPa, a hydrogen production rate of 20 $cm^3$/min, and a water flow rate of 650 $cm^3$/min. The hydrogen water had a hydrogen concentration of 3.5 ppm at 7° C. in water after 30 minutes of operation, and a supersaturated state was maintained.

Example 13

The gas dissolving device 1 illustrated in FIG. 1 was connected to the commercial water server 100 as illustrated in FIG. 3 and circulated four times to generate hydrogen water. A small tube made of polypropylene having an inside diameter of 3 mm and a length of 2.5 m was used as the small tube 5a of the pressure reduction and transfer means 5. The hydrogen water was generated using a pressure of 0.25 MPa, a hydrogen production rate of 20 $cm^3$/min, and a water flow rate of 700 $cm^3$/min. The hydrogen water had a hydrogen concentration of 3.0 ppm at 7° C. in water after 30 minutes of operation, and a supersaturated state was maintained.

Comparative Example 1

The gas dissolving device 1 illustrated in FIG. 1 was connected to the commercial water server 100 as illustrated in FIG. 2 and circulated four times to generate hydrogen water. A small tube made of polypropylene having an inside diameter of 2 mm and a length of 0.4 m was used as the small tube 5a of the pressure reduction and transfer means 5. The hydrogen water was generated using a pressure of 0.05 MPa, a hydrogen production rate of 21 $cm^3$/min, and a water flow rate of 960 $cm^3$/min. The hydrogen water had a hydrogen concentration of 1.6 ppm at 7° C. in water after 30 minutes of operation, and a supersaturated state could not be maintained.

Comparative Example 2

The gas dissolving device 1 illustrated in FIG. 1 was connected to a commercial water server as illustrated in FIG. 2 and circulated four times to generate hydrogen water. A small tube made of polypropylene having an inside diameter of 3 mm and a length of 0.8 m was used as the small tube 5a of the pressure reduction and transfer means 5. The hydrogen water was generated using a pressure of 0.08 MPa, a hydrogen production rate of 21 $cm^3$/min, and a water flow rate of 900 $cm^3$/min. The hydrogen water had a hydrogen concentration of 1.8 ppm at 7° C. in water after 30 minutes of operation, and a supersaturated state could not be maintained.

In each of the examples 1 to 13, it was possible to achieve hydrogen water in a supersaturated state and, moreover, continually maintain the hydrogen water in a supersaturated state. On the other hand, in comparative examples 1 and 2, it was not possible to achieve hydrogen water in a supersaturated state.

INDUSTRIAL APPLICABILITY

The gas dissolving device according to the present invention can be attached not only to a water supply and a water server, but also to a beverage such as tea or juice, a bath, or the like. The gas dissolving device can be used with various liquids that require a gas to be dissolved in a liquid in a supersaturated state and such a supersaturated state to be maintained in a stable manner.

DESCRIPTIONS OF REFERENCE NUMERALS

1 Gas dissolving device
2 Gas producing means
21 Hydrogen producing means
22 Ion exchanging means
23 Hydrogen producing means inlet
24 Hydrogen supply tube
25 Oxygen discharge port
3 Pressurized gas dissolving means
4 Dissolving chamber
41, 42 Dissolving tank
5 Pressure reduction and transfer means
5a Small tube
6 Control mechanism
7, 8 Liquid suction port
9, 10 Discharge port
100 Water server

What is claimed is:

1. A gas dissolving device attachable to a water tank, comprising:
    a chamber,
    a tube, and
    a diaphragm pump that, when attached to the water tank, suctions water from the water tank, imparts the water with hydrogen as hydrogen bubbles to generate hydrogen water, supplies the water, the hydrogen bubbles, and the hydrogen water to the chamber under a pressure of Y MPa, said chamber having an inlet, an upper portion in which hydrogen separated from the hydrogen water accumulates, and a lower portion having the tube connected thereto, said tube having an inside diameter of X mm, an outlet, and a pressure adjusting unit near the outlet, and the value of X/Y is 1.00 to 12.00, and
    wherein the hydrogen water is discharged from the lower portion of the chamber through the tube by laminar flow and thereby pressure variation in the chamber is prevented and the hydrogen water is maintained in a saturated state in the chamber.

2. The gas dissolving device according to claim 1, wherein
    an average size of the hydrogen bubbles decreases over time in a circulation path between the chamber and the diaphragm pump.

3. The gas dissolving device according to claim 2, and further comprising a proton exchange membrane (PEM) system, wherein the proton exchange membrane (PEM) system produces hydrogen by electrolysis across a proton exchange membrane (PEM), and introduces a portion of the hydrogen water stored in the chamber to the proton exchange membrane (PEM) system for electrolysis.

4. The gas dissolving device according to claim 3, wherein the chamber comprises a filter.

5. The gas dissolving device according to claim 1, wherein the hydrogen water is discharged from the outlet of the tube.

6. The gas dissolving device according to claim 1, wherein the tube has a diameter of 1-3 mm.

7. The gas dissolving device according to claim 1, wherein the tube has a length of 1.4 to 3.0 m.

8. The gas dissolving device according to claim 1, wherein the pressure 0.20 MPa to 0.60 MPa.

9. A gas dissolving device attachable to a water tank, comprising:
    a chamber,
    a tube, and
    a diaphragm pump that, when attached to the water tank, suctions water from the water tank, imparts the water with hydrogen as hydrogen bubbles to generate hydrogen water, supplies the water, the hydrogen bubbles, and the hydrogen water to the chamber under a pressure, said chamber having an inlet, an upper portion in which hydrogen separated from the hydrogen water accumulates, and a lower portion having the tube connected thereto, said tube having an inside diameter of 1-3 mm, an outlet, and a pressure adjusting unit near the outlet,
    wherein the hydrogen water is discharged from the lower portion of the chamber through the tube by laminar flow and thereby pressure variation in the chamber is prevented and the hydrogen water is maintained in a saturated state in the chamber.

10. The gas dissolving device according to claim 9, wherein the tube has a length of 1.4 to 3.0 m.

* * * * *